United States Patent

Nylund et al.

[11] Patent Number: 6,151,376
[45] Date of Patent: Nov. 21, 2000

[54] NUCLEAR FUEL ASSEMBLY

[75] Inventors: Olov Nylund, Västerås; David Schrire, Huddinge, both of Sweden

[73] Assignee: ABB AB Atom AB, Basteras, Sweden

[21] Appl. No.: 09/202,498

[22] PCT Filed: Jun. 12, 1997

[86] PCT No.: PCT/SE97/01030

§ 371 Date: Feb. 4, 1999

§ 102(e) Date: Feb. 4, 1999

[87] PCT Pub. No.: WO97/49091

PCT Pub. Date: Dec. 24, 1997

[30] Foreign Application Priority Data

Jun. 20, 1996 [SE] Sweden .................................. 9602451

[51] Int. Cl.[7] ............................. G21C 3/18; G21C 3/10; G21C 3/08

[52] U.S. Cl. ......................... 376/445; 376/443; 376/451; 376/453

[58] Field of Search .................... 376/438, 440, 376/445, 446, 451, 452, 453

[56] References Cited

U.S. PATENT DOCUMENTS 3,669,833  6/1972  De Boeck et al. ........................ 176/74
3,671,393  6/1972  Williams .................................. 176/73
4,678,924  7/1987  Loriot et al. ............................. 29/407
4,914,679  4/1990  Tomiyama et al. ...................... 376/440

FOREIGN PATENT DOCUMENTS 5 9095-496   6/1984  Japan .
6 3047-695   2/1988  Japan .
WO 96/20483  7/1996  WIPO .

Primary Examiner—Charles T. Jordan
Assistant Examiner—K. Kevin Mun
Attorney, Agent, or Firm—Pollock, Vande Sande & Amernick, R.L.L.P.

[57] ABSTRACT

The present invention relates to a fuel assembly with a substantially square cross section for a light-water reactor. The light-water reactor comprises a plurality of fuel rods extending between a top tie plate and a bottom tie plate. A fuel rod comprises a cladding tube which surrounds a column with fissionable material. According to one aspect of the invention, at least one fuel rod is provided with an axial gap in the fissionable material. Around this axial gap, the mass of the material is greater than the mass of the material in the main part of the cladding tube.

8 Claims, 4 Drawing Sheets

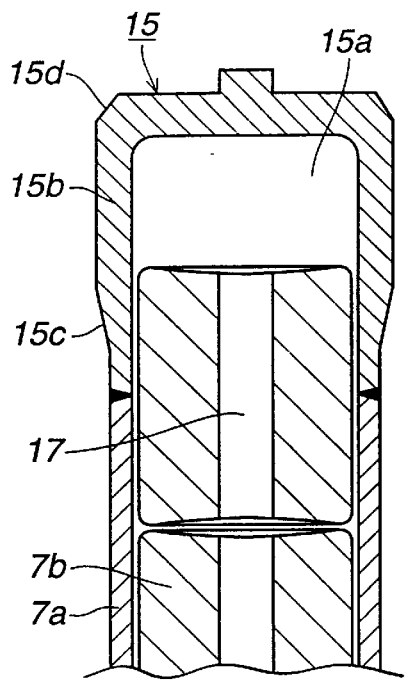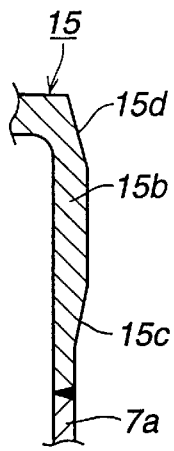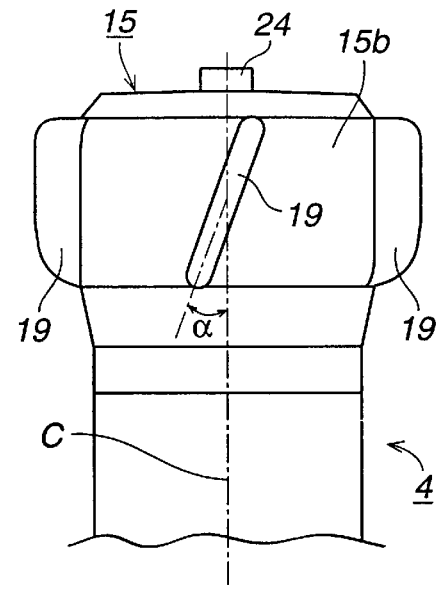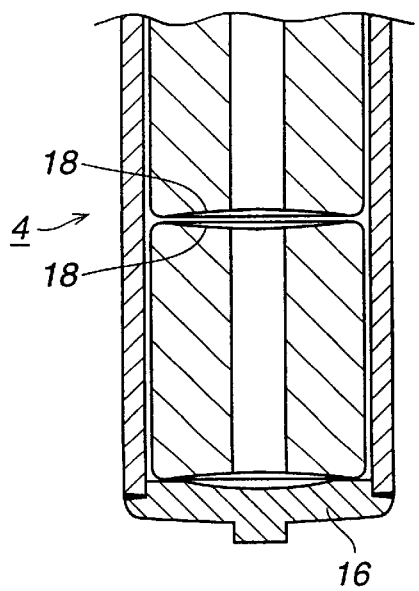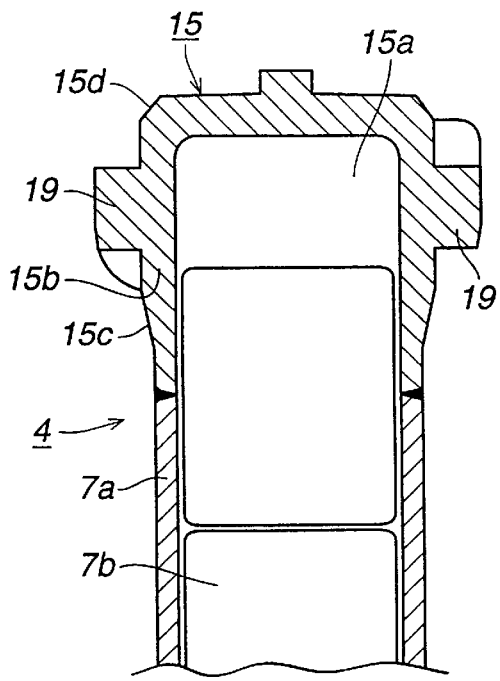
Fig. 4
Fig. 5
Fig. 6a
Fig. 6b

NUCLEAR FUEL ASSEMBLY

TECHNICAL FIELD

The present invention relates to a nuclear fuel assembly with a substantially square cross section for a light water reactor comprising a plurality of fuel rods extending between a top tie plate and a bottom tie plate.

BACKGROUND OF THE INVENTION

In a nuclear reactor, moderated by means of light water, the fuel exists in the form of fuel rods, each of which contains a stack of pellets of a nuclear fuel arranged in a cladding tube. The cladding tube is normally made of a zirconium-base alloy. A fuel bundle comprises a plurality of fuel rods arranged in parallel with each other in a certain definite, normally symmetrical pattern, a so-called lattice. The fuel rods are retained at the top by a top tie plate and at the bottom by a bottom tie plate. To keep the fuel rods at a distance from each other and to prevent them from bending or vibrating when the reactor is in operation, a plurality of spacers are distributed along the fuel bundle in the longitudinal direction. A fuel assembly comprises one or more fuel bundles, each extending along the main part of the length of the fuel assembly.

Together with a plurality of other fuel assemblies, the fuel assembly is arranged in a core. The core is immersed into water which serves both as coolant and as neutron moderator. During operation, the water flows from below and upwards through the fuel assembly, whereby, in a boiling water light-water reactor, part of the water is transformed into steam. The percentage of steam increases towards the top of the fuel assembly. Consequently, the coolant in the lower part of the fuel assembly consists of water whereas the coolant in the upper part of the fuel assembly consists both of steam and of water. This difference between the upper and lower parts gives rise to special problems which must be taken into consideration when designing the fuel assembly.

This problem can be solved by providing a flexible fuel assembly which in a simple manner may be given a shape where the upper part of the fuel assembly differs from the lower part so that optimum conditions may be obtained. A fuel assembly for a boiling water reactor with these properties is shown in PCT/SE95/01478 (Int. Publ. No. WO 96/20483). This fuel assembly comprises a plurality of fuel units stacked on top of each other, each comprising a plurality of fuel rods extending between a top tie plate and a bottom tie plate. The fuel units are surrounded by a common fuel channel with a substantially square cross section. A fuel assembly of this type may in a simple manner be given different designs in its upper and lower parts.

Also in a light-water reactor of pressurized-water type, it may be desirable to design the fuel assemblies so that each fuel assembly comprises a plurality of fuel units stacked on top of each other. As described above, each of the fuel units then comprises a plurality of fuel rods extending between a top nozzle and a bottom nozzle. A fuel assembly for a pressurized-water reactor, however, comprises no fuel channel.

One factor which must be taken into consideration when designing fuel units which are of the order of magnitude of 300–1500 millimeters long is that fission gases are formed during nuclear fission. In addition, the column of fuel pellets expands because of the heat formed in the fuel pellets. To take care of the fission gases and the thermal expansion of the column of fuel pellets, normally a relatively large space, an axial gap, is formed above the uppermost fuel pellet in the cladding tube in known full-length fuel rods, that is, fuel rods of the order of size of 4 metres long. The axial gap is of the order of size of 200–300 millimeters long. To this axial gap, the fission gases may thus diffuse and the column of fuel pellets may expand inwardly here. Thus, the axial gap contains no fissionable material.

Another factor which must be taken into consideration when designing axial gaps is that the temperature of the cladding tube in this region is lower than in the rest of the cladding tube because no fuel pellet is arranged in the axial gap. A problem which may arise as a result thereof is that hydrogen, formed, among other things, upon corrosion of the cladding tube, which is of a zirconium based alloy, and is absorbed thereby, will diffuse into this colder region. In the event that the concentration of hydrogen becomes too high in this region, hydrides are formed in the cladding material and cause embrittlement thereof. In a serious case, the cladding tube may burst and fissionable material may enter the cooling water. A tendency to the same type of problems may also appear in regions between the pellets, that is, where a lower end of a fuel pellet makes contact with an upper end of an adjacently located fuel pellet, and in the region between two fuel units stacked on top of each other. The risk of embrittlement because of too high a concentration of hydrogen increases, to a certain limit, with the size of the axial gap.

It is known to reduce the release of fission gas in different ways. One such way is to provide one or more of the fuel pellets with through-holes in their axial directions. In this way, the temperature in the fuel pellet is reduced, whereby the release of fission gas is reduced and the axial gap may be reduced. In this case, however, an axial gap of the order of size of a few millimeters is needed in a rod with a length of the order of size of 300 millimeters, up to a few tens of a millimeter for longer rods, to allow the thermal expansion of the column of fuel pellets.

The object of the present invention is to provide a fuel assembly for a light-water reactor with a plurality of short fuel units wherein at least one fuel assembly is designed with an axial gap and with means for taking care of hydrogen diffusing into this gap, thus preventing the build-up of impermissibly high concentrations of hydrogen in the material surrounding the axial gap.

SUMMARY OF THE INVENTION

The present invention relates to a fuel assembly comprising a fuel rod with an axial gap for accumulation of fission gases, formed during operation, and thermal expansion of the nuclear fuel.

The fuel rod comprises a cladding tube and a stack of fuel pellets arranged therein, a column with extruded fuel cylinders or an unbroken column of vibration-compacted fuel powder. The cladding tube is sealed by a plug at either end, more particularly with a top plug and a bottom plug, respectively. At the space without fissionable material, the fuel rod is provided with a larger material thickness than the remaining part of the fuel rod. In an advantageous embodiment of the invention, this material thickness is achieved in the top plug. The top plug is then provided with a cavity facing the uppermost fuel pellet arranged in the cladding tube. The top plug is preferably connected to the cladding tube in such a way that its inner diameter corresponds to the inner diameter of the cladding tube and is thickened radially outwardly. In this way, the column of fuel pellets is allowed to expand upwardly and into the top plug because of thermal expansion.

By forming the fuel rod around the axial gap with a larger thickness, the hydrogen-absorbing capacity is increased here. By increased hydrogen absorption, the hydrogen concentration is reduced in the space to a corresponding extent and hence also the risk of embrittlement in the upper part of the fuel rod.

The advantage of the invention is that the risk of embrittlement due to too high hydrogen concentration in the axial gap for thermal expansion and fission gases is reduced by an increase of the quantity of material and hence the hydrogen-absorbing capacity in this region.

The increased quantity of material in the upper part of the fuel rod also entails improved mechanical properties of the upper part in question since it reduces the influence of the stresses in the material which arise because of the fission gases collected in this space.

Another advantage of the invention is that the increased quantity of material in the upper part of the fuel rod entails an improved resistance to damage to the cladding tube in this region caused by abrasion and corrosion and/or erosion. In connection with repair and service of a nuclear reactor, foreign matter (or debris), such as metal chips, may enter the coolant. The debris is then transferred with the coolant when this is circulated through the core. Such debris may in certain cases give rise to abrasion damage on the cladding tube. The abrasion damage may in certain cases arise on a level with the top tie plate as a result of the debris adhering thereto and remaining there. When it is brought into vibration by the coolant which flows past, it wears on the cladding tubes which surround the fuel pellets. In the worst case, the abrasion damage may lead to fissionable material entering the cooling water. Still another advantage is that mixing vanes may be arranged in a simple manner at the upper end of the fuel rod.

BRIEF DESCRIPTION OF THE DRAWINGS

FIG. 4 shows a fuel rod for a fuel unit according to FIG. 1.

FIG. 5 shows in a section of FIG. 4 an alternative embodiment of the outer surface of a top plug.

FIG. 6a shows an embodiment of the upper part of a fuel assembly where a top plug is provided with mixing vanes.

FIG. 6b shows a vertical section through the upper part of the fuel rod as show n in FIG. 6a.

DETAILED DESCRIPTION OF THE PREFERRED EMBODIMENTS

Figure 1:
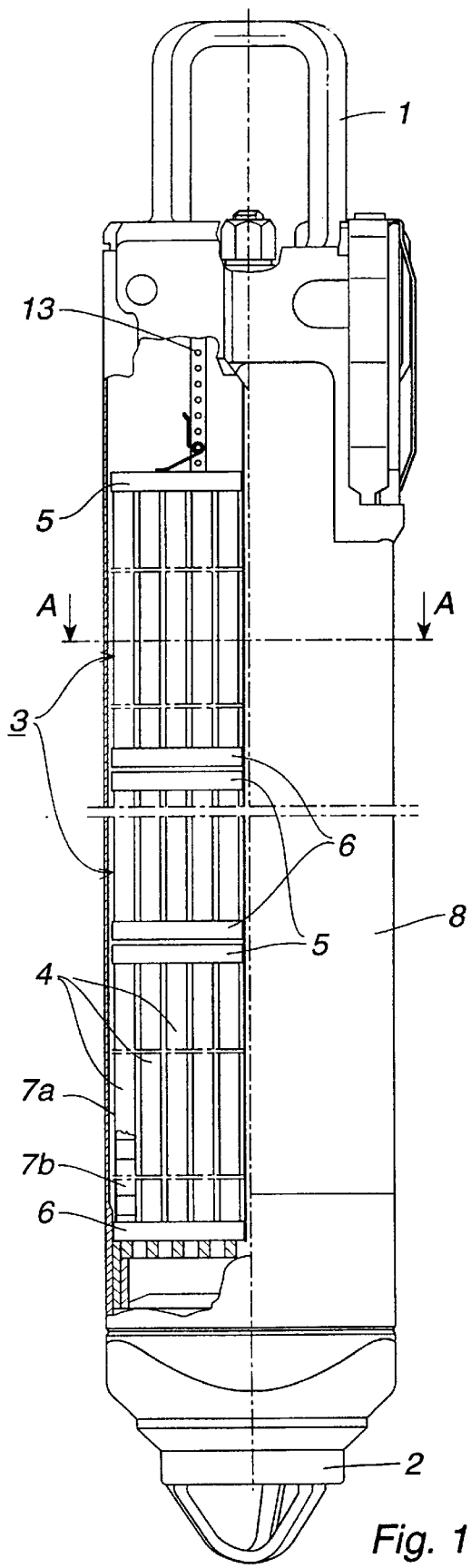
FIG. 1 shows in a view from the side a partially sectioned boiling water fuel assembly with short fuel units.

FIG. 1 shows a fuel assembly according to the invention. The fuel assembly comprises an upper handle 1, a lower end portion 2 and a plurality of fuel units 3 stacked one above the other. Each fuel unit comprises a plurality of fuel rods 4 arranged in parallel and in spaced relationship to each other in a given lattice. Further, each fuel unit 3 comprises a top tie plate 5 and a bottom tie plate 6 for attachment of the fuel rods 4 in their respective positions in the lattice. The fuel units 3 are stacked on top of each other in the longitudinal direction of the fuel assembly and they are stacked in such a way that the top tie plate 5 in one fuel unit is facing the bottom tie plate 6 in the next fuel unit in the stack and so that the fuel rods 4 in all the fuel units 3 are parallel to one another. A fuel rod 4 contains fissionable material in the form of a stack of fuel pellets 7b of uranium arranged in a cladding tube 7a. A coolant is adapted to flow from below and up through the fuel assembly.

Figure 2:
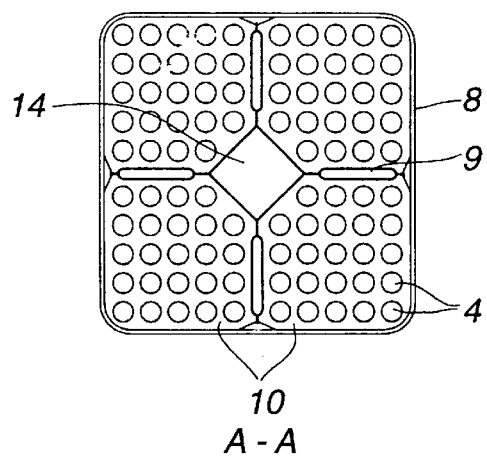
FIG. 2 shows a section A—A of the fuel assembly in FIG. 1.

FIG. 2 shows that a fuel assembly is enclosed in a fuel channel 8 with a substantially square cross section. The fuel channel 8 is provided with a hollow support member 9 of cruciform cross section, which is secured to the four walls of the fuel channel 8. In the central channel 14 formed of the support member 9, moderator water flows. The fuel channel with the support member surrounds four vertical channel-formed parts 10, so-called sub-channels, with an at least substantially square cross section. The four sub-channels each comprises a stack of fuel units 3. Each fuel unit comprises 24 fuel rods 4 arranged in a symmetrical 5×5 lattice.

The fuel assembly in FIG. 2 comprises 10×10 fuel rod positions. By a fuel rod position is meant a position in the lattice. All the fuel rod positions in the lattice need not be occupied by fuel rods 4. In certain fuel assemblies, a number of fuel rods 4 are replaced by one or a plurality of water channels. The introduction of a water channel changes the number of fuel rods 4 but not the number of fuel rod positions.

Figure 2A:
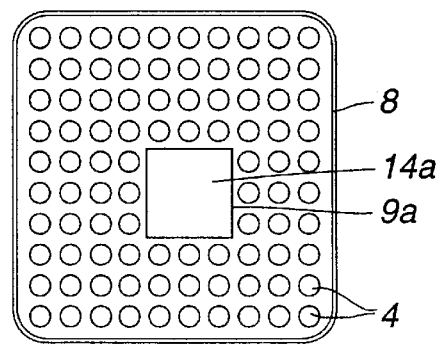
FIGS. 2a and 2b show alternative embodiments in a section corresponding to the section A—A of the fuel assembly in FIG. 1.

FIG. 2a shows an alternative embodiment of a fuel assembly of the same type as that shown in FIG. 1. The fuel assembly is provided with an internal vertical channel 14a through which water is conducted from below and upwards through the fuel assembly. The channel 14a is surrounded by a tube 9a with a substantially square cross section. The fuel units 3 are kept in position by being threaded onto the tube which surrounds the vertical channel 14a.

Figure 2B:
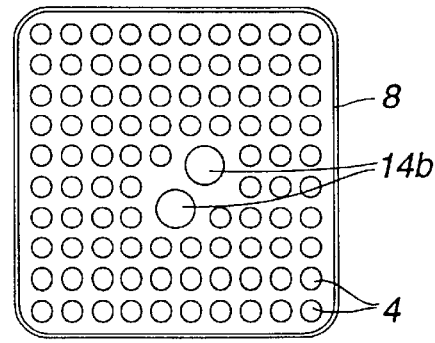

FIG. 2b shows an additional embodiment of a fuel assembly of the same type as that shown in FIG. 1. The fuel assembly is provided with two central vertical water rods 14b through which water is conducted from below and upwards through the fuel assembly. The water rods 14b have a diameter which is somewhat larger than the diameter of the fuel rods 4 and are formed with a substantially circular cross section. The fuel units 3 are kept in position by being fitted onto the water rods 14b.

Figure 3:
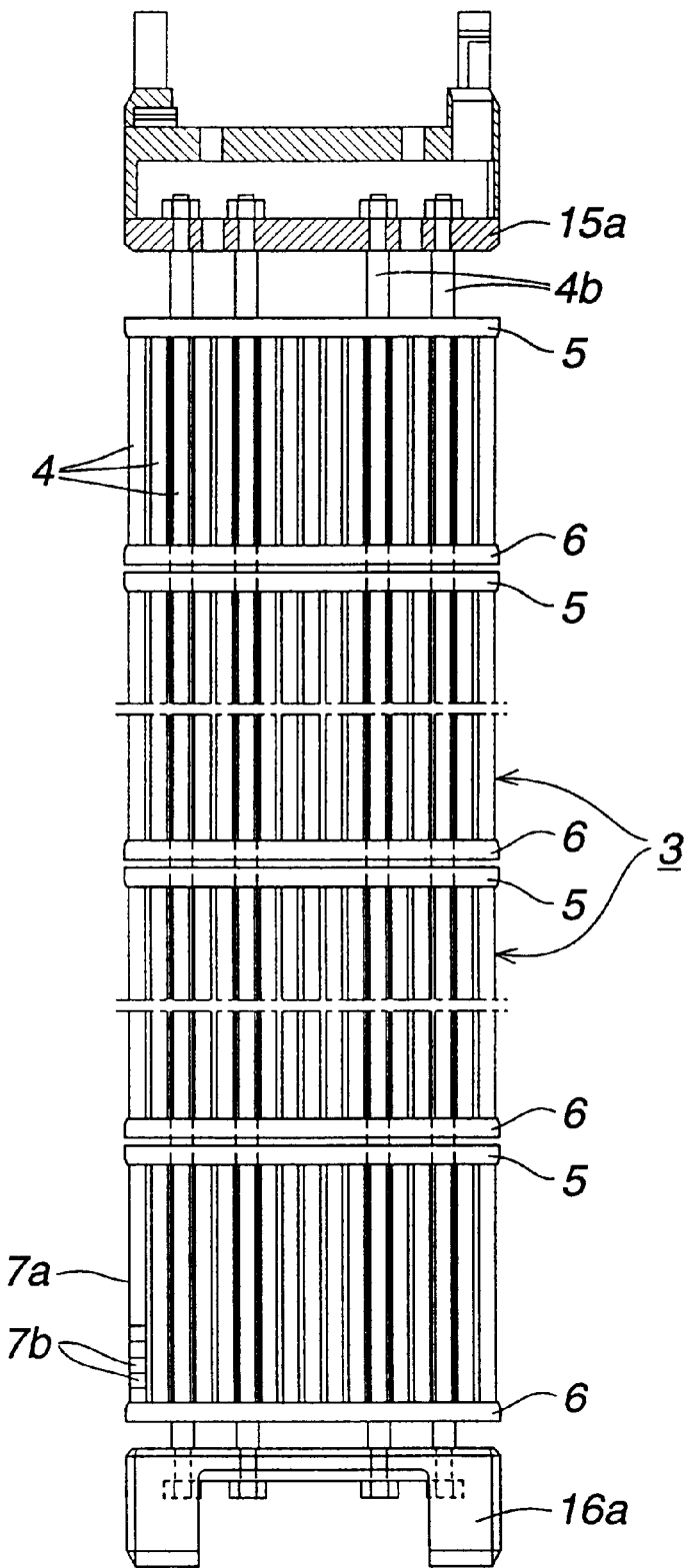
FIG. 3 shows in a view from the side a pressurized-water fuel assembly with short fuel units.

FIG. 3 shows a pressurized-water fuel assembly. In the same way as the fuel assembly in FIG. 1, it comprises a plurality of fuel units 3 stacked on top of each other. Each fuel unit 3 comprises a plurality of fuel rods 4 arranged in parallel and in spaced relationship to each other in a given lattice. Each fuel unit 3 further comprises a top tie plate 5 and a bottom tie plate 6 for attachment of the fuel rods 4 in their respective positions in the lattice. The fuel units 3 are stacked on top of each other in the longitudinal direction of the fuel assembly and they are stacked in such a way that the top tie plate 5 in one fuel unit 3 faces the bottom tie plate 6 in the next fuel unit 3 in the stack, and so that the fuel rods 4 in all the fuel elements 3 are parallel to each other. A fuel rod 4 contains fissionable material in the form of a stack of fuel pellets 7b of uranium arranged in a cladding tube 7a. A coolant is adapted to flow from below and upwards through the fuel assembly. A number of so-called control rod guide tubes 4b are arranged extending through the whole fuel assembly. The control rod guide tubes 4b are intended to receive finger-shaped control rods (not shown) which are inserted into and withdrawn from, respectively, the guide tubes 4b for the purpose of controlling the power of the nuclear reactor. The guide tubes 4b extend between a top part 15a and a bottom part 16a. The top part 15a is arranged above the uppermost fuel unit 3 in the fuel assembly and the bottom part 16a is arranged below the lowermost fuel unit 3 in the fuel assembly.

FIG. 4 shows a fuel rod 4 for a fuel assembly according to FIG. 1, 2, 2a or 2b. The fuel rod 4 comprises, as mentioned above, a cladding tube 7a and a stack of fuel pellets 7b arranged therein. The cladding tube 7a is sealed at the top by a top plug 15 and at the bottom by a bottom plug 16. In FIG. 4 a top plug 15 is shown which is adapted to partially surround part of the column with fuel pellets 7b. The inner diameter of the top plug 15 corresponds to the inner diameter of the cladding tube 7a so as to obtain an even inner side of the fuel rod 4. The top plug 15 is formed with an internal cavity, an axial gap 15a, in which fission gases may accumulate. The axial gap 15a is also intended to allow thermal expansion of the column of fuel pellets 7a.

The fuel rod 4 has a material thickness which around the axial gap 15a is larger than in the rest of the fuel rod 4 (see reference numeral 15b). In FIG. 4, the thicker material 15b around the axial gap 15a is achieved in the top plug 15 which, is thickened radially outwardly. In an alternative embodiment, the cladding tube 7a may be provide with a larger material thickness 15b in the region which is intended to surround an axial gap 15a.

To reduce the release of fission gases, the fuel pellets 7b, as shown in FIG. 4, may be formed with a through-hole 17. In this way, the maximum temperature arising in the central part of the fuel pellets 7a, and hence the release of fission gases, is reduced. By providing the fuel pellets 7b with holes 17, a fission gap space, distributed in the axial direction, is also achieved, whereby the axial gap 15a in the upper end of the rod 4 may be reduced to a corresponding extent. The axial extent of the axial gap 15a is dependent on the length of the fuel rod 4. As an example may be mentioned that, for a fuel rod 4 which has a length of the order of magnitude of 300 millimeters, the axial extent of the axial gap 15a is of the order of magnitude of 2–5 millimeters.

Further, the fuel pellets 7b are formed with cup-shaped upper and lower end surfaces (see reference numeral 18). Because of the thermal expansion, the fuel pellets 7b grow more in the central, warmer parts than in the outer, colder parts. The cup shape 18 thus allows thermal expansion to a certain extent before t he axial gap 15a is utilized for this purpose.

It is important to form the thicker material 15b around the axial gap 15 such that it gives rise to as small a pressure drop as possible. The fuel rod 4 therefore exhibits a smooth transfer between the outer diameter of the cladding tube 7a and the largest diameter of the top plug 15. For the same reason, the upper par t of the top plug 15 is provided with rounded corners.

FIG. 5 shows an alternative embodiment of the outer surface of the top plug 15. This embodiment is intended to give rise to a lower pressure drop in comparison with the embodiment shown in FIG. 4. The transition (see reference numeral 15c) between the smaller and larger diameters of the fuel rod 4 is here made longer than that shown in FIG. 4. In the same way, the upper part of the reference numeral 15d is provided with a more elongated transition.

FIGS. 6a and 6b show an embodiment of the top plug 15 where the plug has been provided with mixing vanes 19. The mixing vanes 19 are formed as bars extending from the outer surface of the top plug 15 in a direction across the flow direction of the coolant and in a direction parallel to the top plug 15. The mixing vanes 19 may be one or more in number. In an advantageous embodiment of the invention, four mixing vanes 19 are arranged evenly distributed along the outer surface of the top plug 15. In FIGS. 6a and 6b, the mixing vanes 19 are shown straight and with an inclination. The inclination may be chosen to be an angle $\alpha$ in relation to the center axis C of the top plug 15 which is of the order of magnitude of 15°–40°. Alternatively, the mixing vanes 19 may be formed with a curved shape to further increase the mixing of the coolant and hence its cooling capacity. Through the otherwise coil-shaped appearance of the top plug 15, the velocity of the coolant is increased upon passage thereof, thus increasing the power of the mixing vanes 19.

Figure 7:
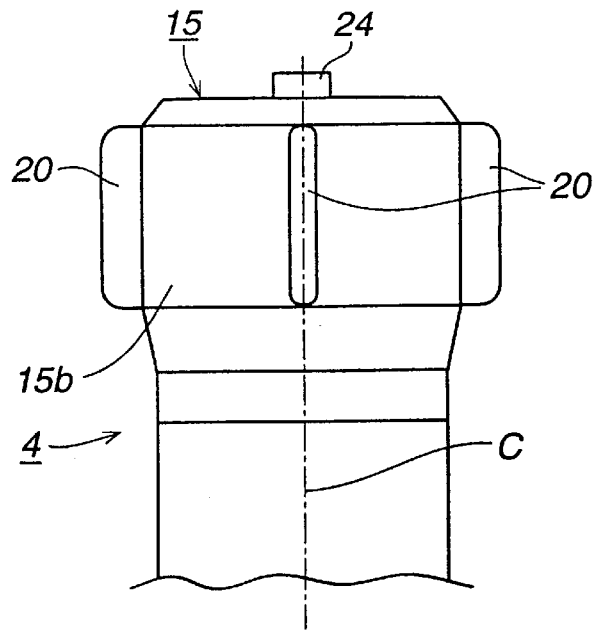
FIG. 7 shows an embodiment of the upper part of a fuel assembly where a top plug is provided with cooling flanges.

In FIG. 7 an embodiment is shown in which the top plug 15 is provided with flanges 20. The flanges 20 are formed so as to extend out from the outer surface of the top plug 15 in a direction across the flow direction of the coolant and in a direction parallel to the center axis C of the top plug 15. This embodiment of the top plug 15 is particularly suitable to arrange in the lower part of the fuel assembly where the need of mixing of the coolant is smaller than in the upper part of the fuel assembly. The object of the flanges 20 is to increase the hydrogen-absorbing ability of the material so that the remainder of the top plug 15 may be given a smaller material thickness. With this embodiment, the hydrogen-absorbing quantity of material may be increased, resulting in a small pressure drop. At the same time, the material thickness in the rest of the top plug may be reduced to a corresponding extent.

The mixing vanes 19 and the flanges 20 also provide a larger surface transmitting heat to the coolant.

Figure 8:
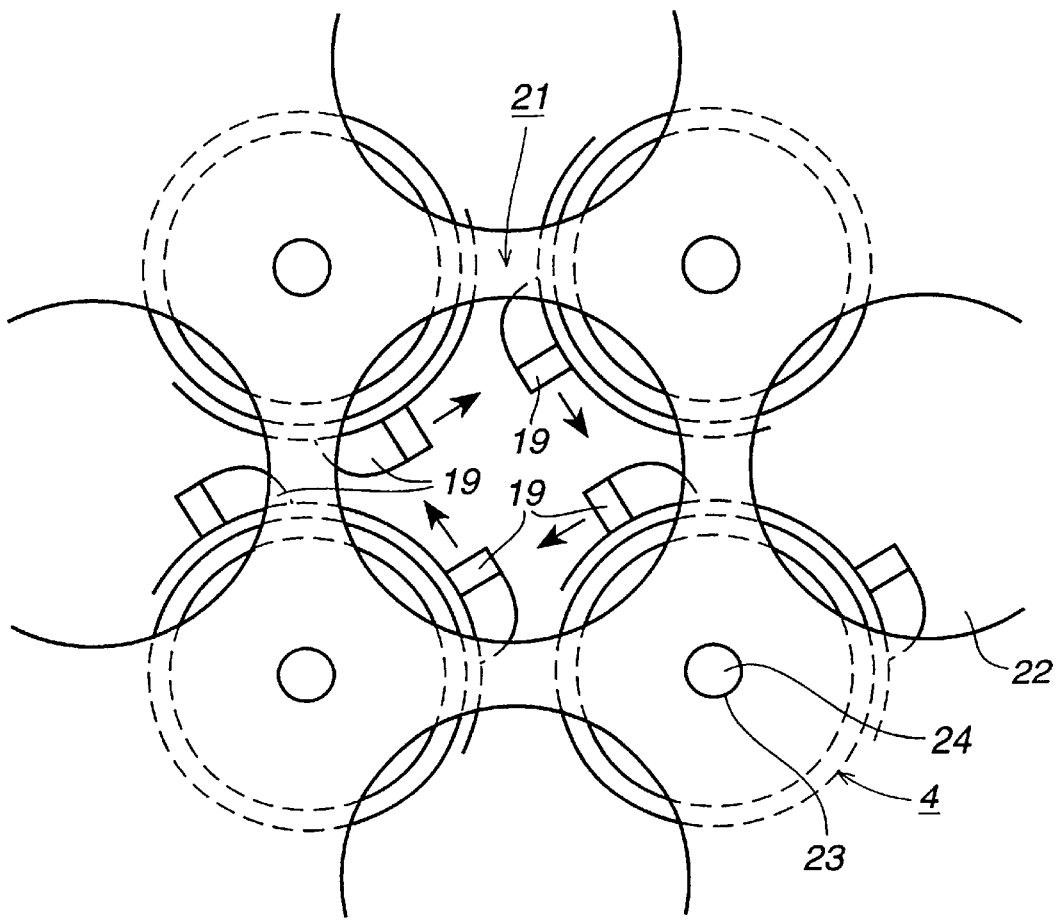
FIG. 8 shows, in a view from above, flow openings in a top tie plate for retaining the upper ends of the fuel rods, which are provided with mixing vanes.

FIG. 8 shows in a view from above, a top tie plate 21 for retaining the upper ends of the fuel rods 4. The top tie plate 21 comprises a plurality of flow openings 22 for passage of the flow flowing upwards through the fuel assembly. Further, top tie plate 21 comprises openings 23 for receiving and positioning pins 24 arranged in the upper part of the top plug 15.

In an advantageous embodiment, the mixing vanes 19 are adapted so as to be completely or partially covered by the surfaces of the top tie plate 21 which are formed across the flow direction between the flow openings 22. In this way, the pressure loss caused by the mixing vanes 19 and the flanges 20, respectively, is limited.

What is claimed is:

1. A fuel assembly for a light-water reactor with a substantially square cross section comprising a plurality of fuel rods extending between a top tie plate and a bottom tie plate, wherein a coolant is adapted to flow from below and up through the fuel assembly and a fuel rod comprises a cladding tube which surrounds a column of fissionable material wherein at least one fuel rod is provided with an axial gap in the fissionable material and wherein a thickness of a unitary material around the axial gap is greater than a thickness of a material in a main part of the cladding tube.

2. A fuel assembly according to claim 1, wherein the axial gap is arranged in the upper part of the fuel rod.

3. A fuel assembly according to claim 1, wherein the axial gap is arranged surrounded by a top plug adapted to seal the upper end of the cladding tube and wherein the greater thickness is arranged in the top plug.

4. A fuel assembly according to claim 1, wherein a diameter of the axial gap corresponds to an inner diameter of the main part of the cladding tube.

5. A fuel assembly according to claim 1, comprising a plurality of fuel units, each comprising said plurality of fuel rods, wherein an axial extent of said axial gap is dependent on a length of said fuel rods.

6. A fuel assembly according to claim 1, wherein said unitary material is metallurgically homogeneous.

7. A fuel assembly according to claim 1, wherein a portion of said unitary material is formed into mixing vanes or flanges.

8. A fuel assembly according to claim 7, wherein said mixing vanes are formed as bars extending out from the outwardly-facing surface of the material and are disposed at an angle $\alpha$ in relation to a center axis of said cladding tube.

* * * * *